March 11, 1924.       H. BOCK       1,486,477

AUTOMOBILE SIGNAL

Filed Feb. 4, 1922       2 Sheets-Sheet 1

Inventor:
Herman Bock

Witness:
R. E. Weber

By
Attorneys

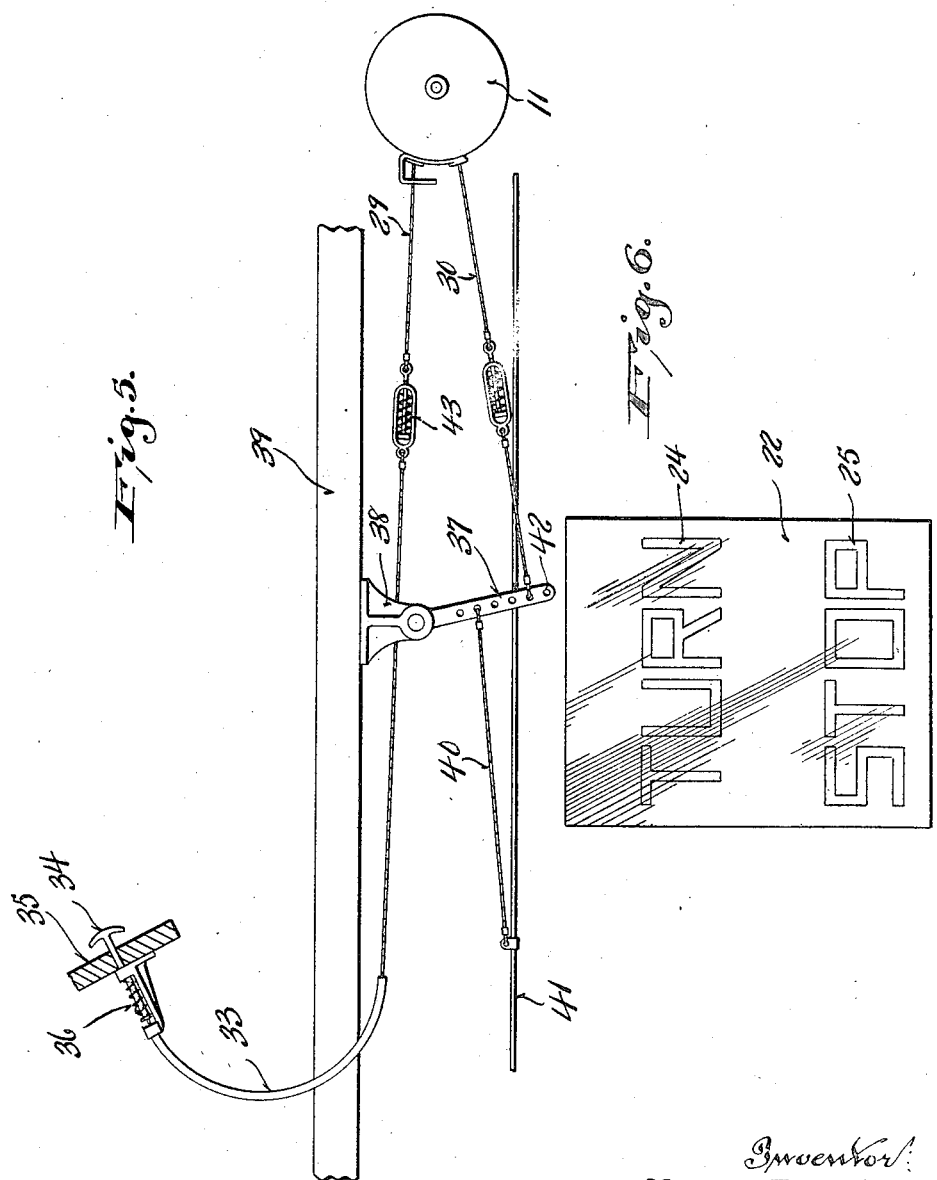

Patented Mar. 11, 1924.

1,486,477

UNITED STATES PATENT OFFICE.

HERMAN BOCK, OF MILWAUKEE, WISCONSIN, ASSIGNOR OF ONE-HALF TO JOHN SANDER, OF MILWAUKEE, WISCONSIN.

AUTOMOBILE SIGNAL.

Application filed February 4, 1922. Serial No. 534,120.

*To all whom it may concern:*

Be it known that I, HERMAN BOCK, a citizen of the United States, and resident of Milwaukee, in the county of Milwaukee and State of Wisconsin, have invented certain new and useful Improvements in Automobile Signals; and I do hereby declare that the following is a full, clear, and exact description thereof.

My invention relates to an automobile signal which normally performs the function of an ordinary tail-light, but which may also be used to signify to those approaching from the rear, the intention of the driver to stop or to make a turn.

The general object of the invention is to construct a device of this kind, which may be attached to any automobile with very little trouble, and which will be simple in construction and reliable in its operation.

It is also an object of the invention to provide a simple device by means of which the stop signal will be automatically displayed whenever the brakes are applied, and also to provide readily accessible means for operating the device to indicate the intention of the driver to turn.

The structure of my invention will be more fully understood from the following description in connection with the accompanying drawings, in which—

Figure 5 is a diagrammatic view, illustrating the mechanism by means of which the signal is operated, and Figure 6 is a development of the cylindrical surface which bears the signal indicia.

Figure 1:
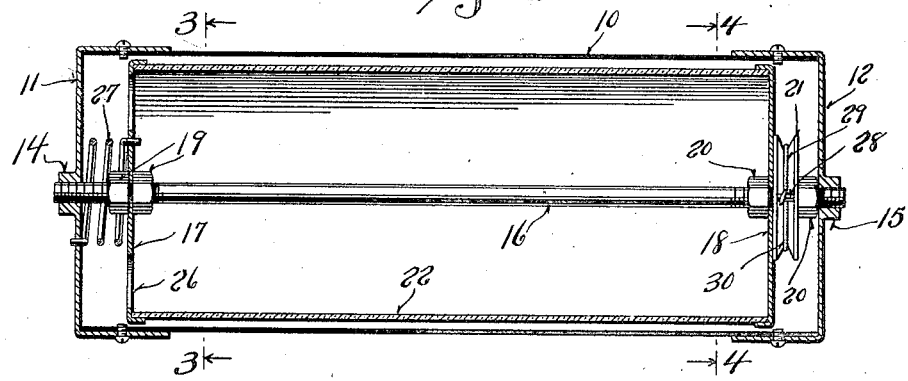
Figure 1 is a vertical longitudinal sectional view thru the signalling member taken substantially on the line 1—1 of Figure 3.
Figure 2:
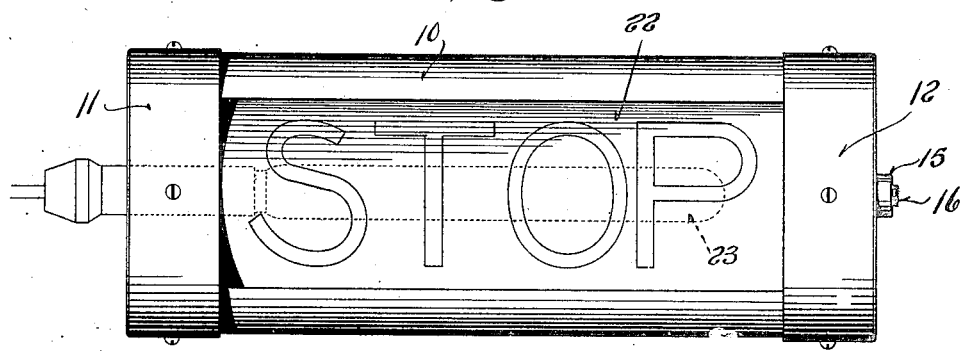
Figure 2 is a rear elevation of the same, in one of its operative positions.
Figure 3:
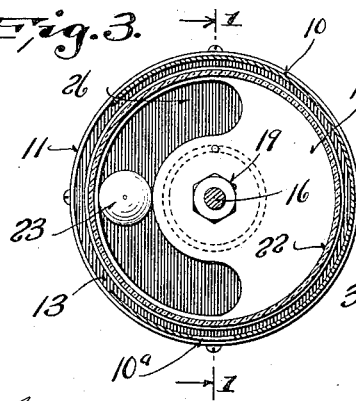
Figure 3 is a cross sectional view on the line 3—3 of Figure 1.
Figure 4:
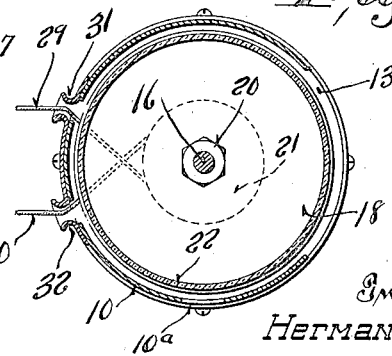
Figure 4 is a cross sectional view on the line 4—4 of Figure 1.

Referring more particularly to the drawing, the numeral 10 indicates a cylindrical opaque outer casing, to which end walls 11 and 12 are secured by screws or other suitable fastening device, said casing 10 having a window 13 formed therein. The end walls have central bearing sockets 14 and 15 respectively, in which is supported a rod or axle 16. End plates 17 and 18 are secured to the rod 16 by means of lock nuts 19 and 20 respectively, the nuts 20 also securing a sheave 21 therebetween adjacent the plate 18. The end plates carry a cylindrical transparent casing 22, within which is displayed an electric light 23, which is supported in the end wall 11. The light normally shines thru the window 13, central portion of the casing 22 which is colored red and thereby performing the function of an ordinary tail-light. A slot 10ª is also provided in the casing 10 so that the license plate may be illuminated.

Located above and below the window 13, when the cylinder 22 is in its normal position, are signalling indicia 24 and 25, which, by mechanism hereinafter described, may at times be oscillated to a position in front of the window 13. The lamp 23, which is carried by the end wall of the casing 10, extend into the cylinder 22 thru an arcuate slot 26, the ends of which act as a stop to limit the oscillatory movement of the cylinder. A coil spring 27 holds the cylinder normally in its central position wherein the ordinary tail-light only is displayed.

The sheave 21 is provided on its near side with a pin 28 to which is secured a cord or cable which extends in each direction therefrom about the sheave, and forwardly, as indicated at 29 and 30, respectively. The front side of the casing 10 is provided with a pair of eyelets 31 and 32, thru which the cords extend towards the forward part of the machine. The cord 29 may extend thru a guide 33, and be secured to a reciprocatory stem 34, located in the dash 35. A spring 36 is preferably secured to the stem to hold it normally in a retracted position. The cord 30 is preferably attached at its front end to a radius bar 37, which is mounted in a bracket 38, secured underneath the body 39. A suitable cord 40 is attached at one end to the radius bar and at the other end to the brake rod 41.

Thus it will be seen that whenever the brakes are applied, the radius bar 37 will be moved forwardly and the cylinder 22 will be oscillated in a direction to bring the word "stop" in front of the window 13. The movement of the brake rod is multiplied by means of the radius bar, and a plurality of holes 42 may be provided so that the extent of oscillation which takes place automatically upon depression of the brake pedal, may be accurately adjusted.

In case the driver intends to make a turn, he simply pulls out the stem 34 on the dash and oscillates the cylinder 22 in the opposite direction. Swivelled take-up members 43 may be provided in the cords 29 and 30, in order to take up any slack therein.

From the foregoing description, it will be seen that I have invented a simple and practical device which may be used more especially at night in order to indicate with certainty to drivers in the rear when it is intended to stop or to make a turn, and the stop signal will be automatically operated whenever the brakes are applied. It will be understood that the current to the lamp 23 is switched off in the daytime.

While I have shown and described one form in which my invention may be embodied, it will be understood that various modifications may be made in the precise structural details thereof, without departing from the spirit of the invention.

I claim:

1. In a device of the class described, a cylindrical opaque casing having a window therein, a transparent casing rotatably mounted within the first mentioned casing and coaxial therewith, a spring normally holding the transparent casing in a predetermined position, signalling indicia on said transparent casing on each side of the window and normally concealed by the outer casing, means for oscillating the transparent casing in either direction to bring the indicia into view, and a lamp supported by one end of the outer casing and projecting within the transparent casing, said last named casing being provided with an arcuate slot through which the lamp projects and the ends of which limit the oscillation of the casing.

2. The combination with an oscillatory signal device adapted to be displayed at the rear of an automobile and normally showing an ordinary tail light, means connected therewith and operable by movement of the brake rod in setting the brakes, to oscillate the signal device to display a "stop" signal, means adapted to be secured to the panel on the dash and manually operable to oscillate the signal device in the opposite direction to display a "turn" signal, and means for automatically restoring said signal device to its initial position.

3. The condition of an automobile having a brake mechanism, a signal device adapted to be mounted adjacent the rear of said automobile and normally showing an ordinary tail light, expansible means connecting said signal device and brake mechanism to oscillate the signal device to display a stop signal when the brakes are actuated, expansible manually operable means connected with said signal device to oscillate the signal device in the opposite direction to display a turn signal, and means for automatically restoring said signal device to its initial position.

In testimony that I claim the foregoing I have hereunto set my hand at Milwaukee, in the county of Milwaukee and State of Wisconsin.

HERMAN BOCK.